US006710345B2

(12) United States Patent
Carter et al.

(10) Patent No.: US 6,710,345 B2
(45) Date of Patent: Mar. 23, 2004

(54) DETECTION OF THERMALLY INDUCED TURBULENCE IN FLUIDS

(75) Inventors: Edwin Christopher Carter, Wootten (GB); Christopher Frederick Carter, Wootten (GB); Nicholas Frederick Stogdale, Kingsthorpe (GB); Bryan Lorrain Humphreys Wilson, Northants (GB)

(73) Assignee: Infrared Integrated Systems Limited, Towcester (GB)

( * ) Notice: Subject to any disclaimer, the term of this patent is extended or adjusted under 35 U.S.C. 154(b) by 181 days.

(21) Appl. No.: 09/826,126

(22) Filed: Apr. 4, 2001

(65) Prior Publication Data

US 2002/0100874 A1 Aug. 1, 2002

(30) Foreign Application Priority Data

Apr. 4, 2000 (GB) ........................................... 0008261

(51) Int. Cl.[7] ............................................ G01N 11/00
(52) U.S. Cl. ................................ 250/338.5; 250/339.15
(58) Field of Search .......................... 250/338.5, 339.15

(56) References Cited

U.S. PATENT DOCUMENTS

| | | | | | |
|---|---|---|---|---|---|
| 3,558,898 | A | * | 1/1971 | Block et al. | 250/575 |
| 3,595,078 | A | * | 7/1971 | Beck et al. | 73/861.04 |
| 5,289,275 | A | | 2/1994 | Ishii et al. | 348/154 |
| 5,313,060 | A | * | 5/1994 | Gast et al. | 250/221 |
| 5,488,355 | A | * | 1/1996 | Tindall et al. | 340/578 |
| 5,625,342 | A | | 4/1997 | Hall et al. | 340/578 |
| 5,937,077 | A | * | 8/1999 | Chan et al. | 382/100 |
| 6,184,792 | B1 | * | 2/2001 | Privalov et al. | 340/578 |
| 2002/0148965 | A1 | * | 10/2002 | Haufe | 250/342 |

FOREIGN PATENT DOCUMENTS

| | | | | |
|---|---|---|---|---|
| EP | 0 853 237 A1 | 7/1998 | | G01J/5/34 |
| GB | 2 269 454 A | 2/1994 | | G08B/17/12 |
| GB | 2 320 959 A | 7/1998 | | G08B/17/12 |
| GB | 2 239 277 A | 1/2000 | | G08C/15/06 |
| GB | 2 340 222 A | 2/2000 | | G08B/13/194 |
| WO | 86/06859 | 11/1986 | | G08B/17/12 |
| WO | 88/02891 | 4/1988 | | G06F/15/62 |

OTHER PUBLICATIONS

U.S. patent application Ser. No. 09/558,279, Hollock et al., filed Apr. 25, 2000.

U.S. patent application Ser. No. 09/579,636, Galloway et al., filed May 26, 2000.

U.S. patent application Ser. No. 09/643,099, Galloway, filed Aug. 21, 2000.

U.S. patent application Ser. No. 09/805,091, Galloway, filed Mar. 13, 2001.

* cited by examiner

*Primary Examiner*—David Porta
*Assistant Examiner*—Christine Sung
(74) *Attorney, Agent, or Firm*—Moser, Patterson & Sheridan, L.L.P.

(57) ABSTRACT

A turbulent fluid, such as a flame, is examined using an array of infrared detector elements. The relationship between the thermal emissions received by different elements at different times is analysed, for example using correlation functions. This enables existence of a flame to be verified and the nature of the flame to be identified.

12 Claims, 4 Drawing Sheets

DETECTION OF THERMALLY INDUCED TURBULENCE IN FLUIDS

The present invention relates to the identification of thermally induced turbulence in fluids, i.e. liquids, gases or vapours, and is particularly applicable to the detection of temporal variations in the temperature of flames.

The flow of a fluid with gradients of temperature may be measured in various ways, such as by thermocouples placed within the fluid. Such invasive methods may disturb the flow of the fluid itself and may be difficult to implement if the fluid is difficult to access or fills a large volume. Therefore remote sensing methods in which the fluid is imaged onto a detector array have advantages, though it is then necessary to devise methods for distinguishing the bulk temperature of the fluid from variations in emissivity or from the background.

An important class of fluid flow is that which occurs in flames. Combustion products within and above the envelope of a flame, such as carbon dioxide and water, are known to emit characteristic infrared radiation. It is also known that this radiation is not constant in time but varies (flickers) giving frequency components substantially between 1 Hz and 20 Hz. Known infra-red detectors isolate these wavelengths by means of a suitable spectral filter or use electronic signal processing of the detector output to detect this "flicker". In some cases additional sensors are used at different wavelengths in order to differentiate between flames and other sources of infrared radiation such as the sun, lighting equipment or hot machinery such as welders. Instruments of this type work well but cannot provide directional or spatial information because they consist of single element detectors looking into a wide viewing angle without imaging optics. Optical constraints may also give rise to high costs.

Sometimes spatial information is essential: for example if it were necessary to monitor two flames, one wanted and one unwanted in close proximity, or if the location of the flame within a protected area were required in order to selectively deploy countermeasures. Spatial data about the flame itself and its surroundings give the possibility of greater certainty of detection and a lower false alarm rate. In cases such as these an array of detectors may be used in conjunction with a mirror or infra-red transmitting lens which image the scene onto the array. The derived image may be analysed by computer system or monitored by eye. These instruments can provide a great deal more information about the scene viewed and in particular it is possible to discern structure within the flame itself.

The present invention was devised with the aim of accurately distinguishing flames from other hot objects emitting infrared radiation. The invention is based on the discovery that flames (even steady flames with no "flicker" exhibit distinctive temporal variations in temperature which, with the advent of array based detectors, can be identified. Nevertheless, the method of the invention has wider applications for identifying turbulence in general.

Thus, the present invention provides a method of identifying thermally induced turbulence in fluids comprising:

(a) forming an image of the fluid on an array of thermal detector elements;

(b) detecting thermal emissions from the fluid using the array; and (c) repeatedly examining the relationship between the thermal emission received by a first element at a particular point in time and the thermal emission received by a second element at a subsequent time whereby to detect temporal variations in temperature due to turbulence.

It has been found that in a flame a "hot spot" in the absence of draughts, tends to progress upwardly. Therefore, as a minimum, the method of the invention will examine two elements, the second element corresponding to a portion of the fluid which is higher than that to which the first element corresponds. Usually the two portions of the fluid will be adjacent to each other. In order to examine the whole of the flame structure, the examination may be repeated for all vertically adjacent pairs of elements in the array. Alternatively, the method may be confined to a portion of the array which has been identified as possibly viewing a flame by some other method. For example, the method of the invention may be confined to elements of the array which have been previously identified as exhibiting signals above a certain threshold, and possibly a set of elements surrounding those elements.

The method need not be confined to vertically adjacent pairs of elements and may be repeated for all adjacent pairs of elements in the array. For example, if a flame is affected by side winds, the turbulence trends may be side-ward rather than upward. Furthermore strong turbulence, which may arise in large uncontrolled flames, also leads to increasing correlation in all directions.

In the preferred embodiment of the invention, the relationship between signals from pairs of elements is examined by calculating the cross correlation function $$c(T) = \sum_i x(t_i)y(t_i + T) \text{ for different values of } T$$

where i is an integer, $x(t_i)$ is the signal received from the first element at time $(t_i)$ and y $(t_i+T)$ is the signal received from the second element at time $(t_i+T)$; whereby to identify a maximum in the relationship between c(T) and T.

The significance of this mathematical relationship will be discussed in more detail below. The maximum value of c(T) may be compared with pre-set limits as can the value of T at the maximum value of c(T) as further steps in the correct identification of flames or other known phenomena.

The method described above will be best matched to low to medium resolution thermal infrared arrays. Typically the array will have at least 10 and not more than 10,000 elements and preferably at least 64 and not more than 1,024 elements.

Preferably only radiation at wavelengths longer than 2 micrometers is detected. Preferably the maximum wavelength radiation detected is 15 micrometers.

The invention also provides apparatus for carrying out the methods described above.

An embodiment of the invention will now be described by way of example only and with reference to the accompanying drawings in which.

In the preferred embodiment of the invention, an image of a flame is formed by an array of passive infra-red (PIR) detectors where, in the absence of a chopper or other means of modulating the incoming radiation, information is only obtained about movements in the scene or changes in temperature. A stationary scene does not produce an "image" as such. As is well known, in contrast to thermal imaging devices, such arrangements reduce the amount of information to be processed or monitored by eye. One example of a PIR detector is a pyroelectric detector. The preferred array is a two dimensional array of detector elements incorporated in a single device with each element viewing a different area of the scene.

As noted above, a characteristic of flames is that they are not entirely constant but temporal variations in temperature arising from thermal convection and diffusion spread from one region of the flame to another. Once such a flame is imaged onto a detector array as described above, these temporal variations will manifest themselves in temporal variations in the outputs from individual detector elements.

Where the flame arises from a spreading fire rather than a more or less steady flame in a gas burner, further temporal variations arise from the spread of the fire itself. The method of this invention may use these variations to detect the presence of a flame, and if desired, to locate it within the scene. In order to do this, information is extracted from the raw signals from the multiple elements of the detector and correlations between the signals sought.

Correlation functions have many applications in signal processing and indicate in general terms whether processes have any statistical regularity in themselves or if there is a relationship between apparently random variables.

Figure 1:
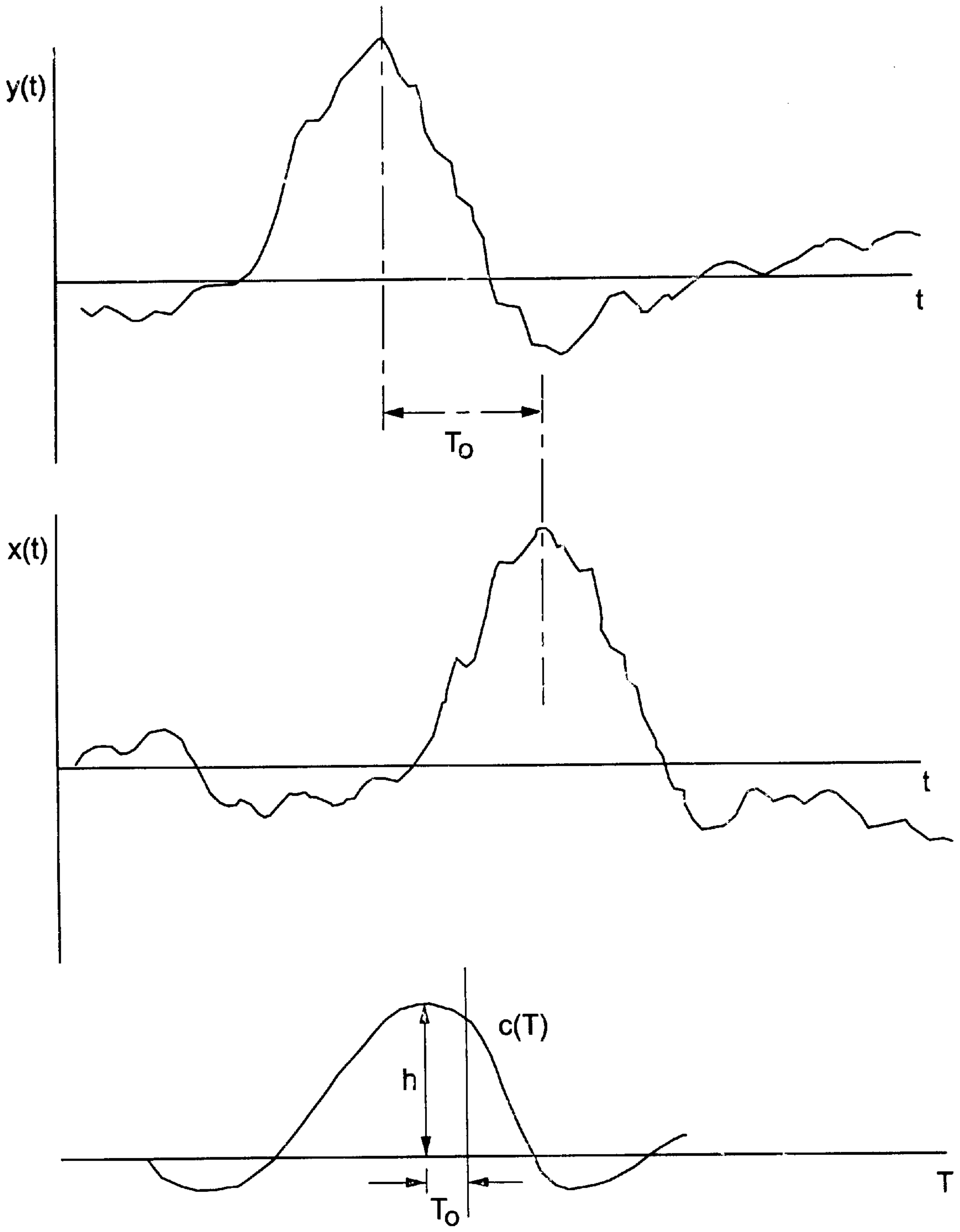
FIG. 1 is a series of graphs showing a typical example of the time variation of the amplitudes of the signals x, y and the corresponding values of the correlation function c(T)

The cross correlation function, c(T), between two signals x (t) and y (t) is defined as $\int x(t)y(t+T)\,dt$. Suppose the functions x(t) and y(t) are the time series data of outputs from two separate elements of a detector array. If the detectors are sampled at intervals the integral may be approximated by a time series defined by the sampling rate $$c(T) = \sum_i x(t_i)y(t_i + T)$$

the meaning of which is that the two time series are multiplied together for different values of a delayed time T. The cross correlation function c(T) will be zero if the two random processes causing x(t) and y(t) are independent. (As is well known the correlation function may be normalised with respect to the amplitudes of the signals). If the two processes are not independent, the cross correlation function may exhibit a peak about a value of $T_0$ which we shall call the lag. The height h of the normalised cross correlation function at this point is a measure of the strength of the correlation. Examples of x(t), y(t) and c(T) for a pair of detector elements viewing a flame are shown in FIG. 1. The time t is usually incremented periodically, for example at an interval of 1 millisecond.

Figure 2:
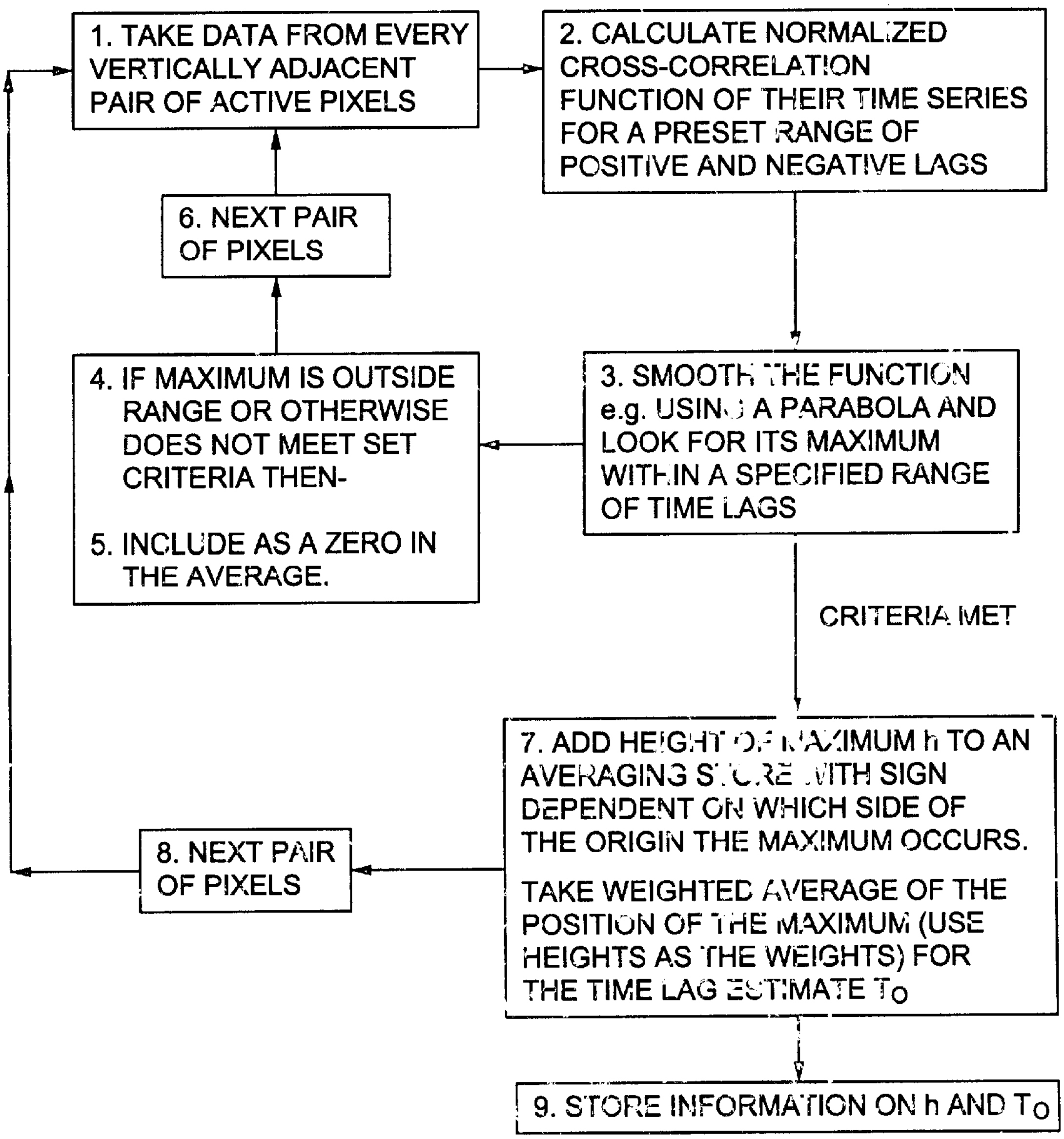
FIG. 2 is a flow chart of a computer algorithm suitable for carrying out a method according to the invention.

FIG. 2 shows a flowchart for a computer algorithm to determine the possible presence of a flame in the field of view of a detector array. At step 1, data is taken from a pair of vertically adjacent "active" pixels, ie. pixels exhibiting above threshold signals. At step 2, the cross correlation function c(T) is calculated for a range of realistic positive and negative values of T.

In step 3, in order to calculate $T_0$ and h, the algorithm attempts to find a maximum, for example by fitting a parabola to the data (this being the simplest even polynomial). At step 4, a decision is made as to whether the parabola is indicative of a possible flame. Thus, if the parabola has a minimum rather than a maximum or if the maximum is outside a specified range of realistic values, the data is rejected and the algorithm proceeds to steps 5 and 6 where zeros are included in an averaging store and the next pair of pixels is examined commencing at step 1. If, at step 4, the characteristics of the parabola indicate the possibility of the presence of a flame, the value of h for the parabola as well as the value of $T_0$ are added to averaging stores at step 7 before another pair of pixels is examined at step 8. At step 9 information on h and $T_0$ is stored for comparison with data relating to known types of flame. For example, a well defined evenly burning flame in still conditions will return a large valve value of h; a fast pre-mixed flame from a blow torch will return a short $T_0$ whilst a slow diffusion flame from an open pan will return a long $T_0$.

Figure 3:
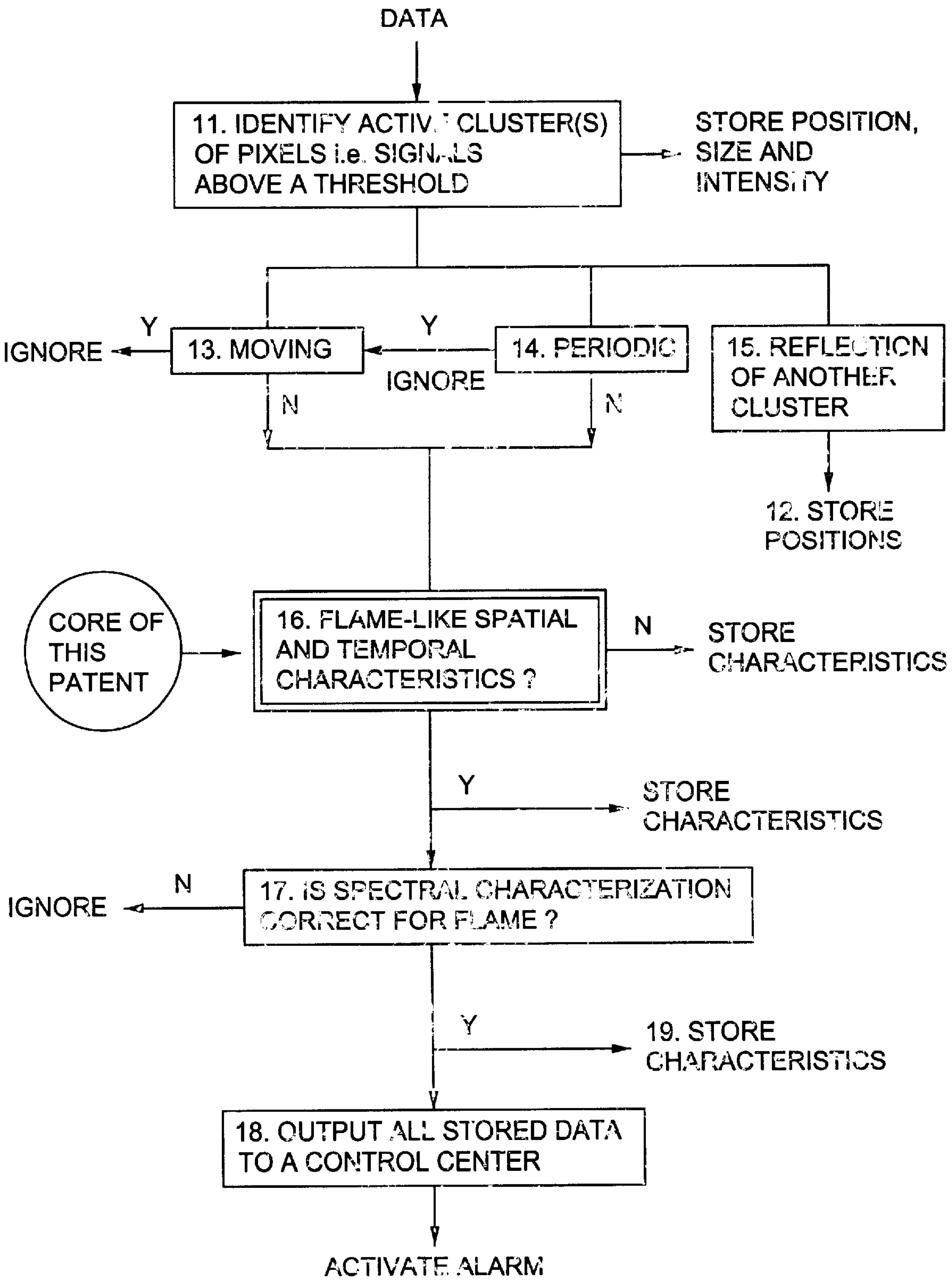
FIG. 3 is a decision tree for a flame detector incorporating the method according to the invention.

In practice, in a full system, several algorithms will run either in parallel or in sequence. A possible decision tree is shown in FIG. 3 to demonstrate one example of a context in which the present invention may be placed, in this case a fire alarm. In block 11 of the decision tree of FIG. 3, "active" clusters of detector elements are identified, i.e., those which produce signals above a predetermined threshold. At block 12, the relative position of those elements with respect to the array as well as the intensity of the corresponding signals are stored. At blocks 13, 14 and 15 decisions as to the nature of the signals are made.

If any active cluster moves within the scene in a particular direction, it is more likely that it is indicative of an object such as a person or animal and thus, in the context of flame detection, signals from the cluster are ignored although this information would be useful in a combined flame/intruder detector.

If the signals vary periodically with the same period, they could be indicative of a rotating object such as a fan in the scene being viewed and these are likewise ignored. Periodic variations may be detected by calculating the autocorrelation functions given when x=y; the Fourier transform of this gives the power spectrum which directly shows the frequencies present.

Furthermore, at step 15, the signals from clusters are compared with signals from other clusters as possible reflections. For example, a fire occurring over water might produce a reflection on the water which would appear similar to the original fire but at a lower intensity. Signals due to reflection are ignored in a single instrument but may be of value if an interface with other sensors were to be required.

Next, at block 16, the algorithm described with reference to FIG. 2 is used to determine whether the cluster exhibits flame-like spatio-temporal characteristics. Here again the calculation of autocorrelation coefficients is useful. Several autocorrelation times may be found of randomly varying height. If the periods of variation are within the frequency range 1–20 Hz, this may arise from the characteristic flicker of flames. Here the information from individual elements is a more sensitive indicator than can be obtained from a single element viewing the whole scene. In the affirmative the spectral characteristics of the signals are also examined at step 17 in order to determine whether a flame is present. This might be done by placing a filter over the array which passes the emission band of carbon monoxide and carbon dioxide gases characteristic of most fires. Other independent detectors operating in different spectral regions might also be used to discriminate against other infrared emitters such as the sun, artificial lighting or electric welders. In the affirmative, an alarm may be activated at step 18. Also, the relevant element positions will be stored at step 19. Thus it will be seen that the presence of correlation is not the sole criteria used to judge whether a flame is present but it is one step in a decision making process.

The decision tree may be modified so that the information obtained at each stage all contributes to the final decision rather than a simple YES/NO decision being made at each stage. The system may be configured so that the various test run in parallel rather than in sequence as illustrated.

Figure 4:
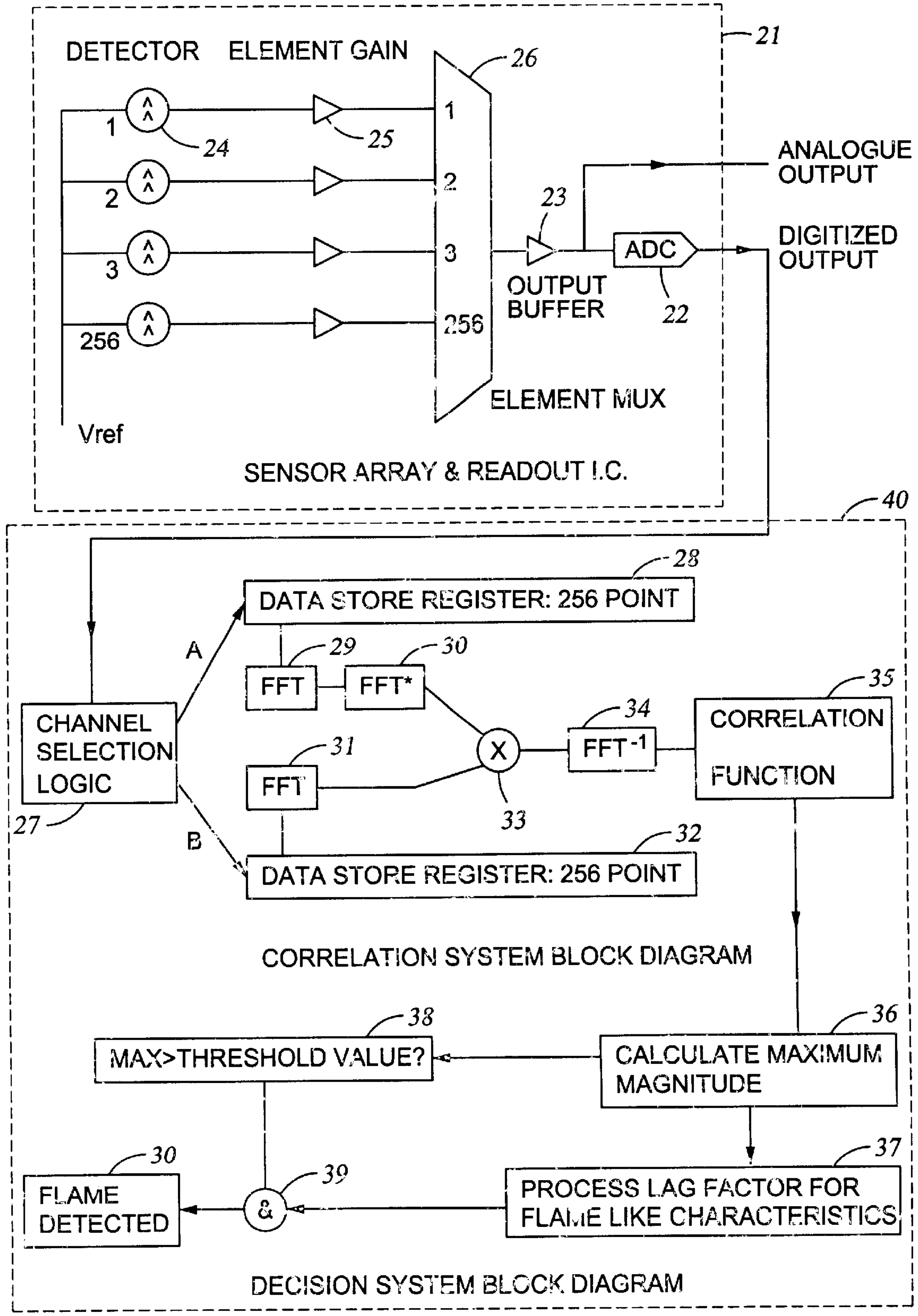
FIG. 4 is a schematic diagram of a system capable of carrying out the method according to the invention.

FIG. 4 illustrates a sensor system suitable for carrying out the invention, comprising an integrated circuit 21 having an array of sensing elements which are sensitive to infra-red radiation in conjunction with a signal processing and adaptive decision making system to extract and evaluate information from an observed scene. This system contains within it an array of 16×16 sensing elements 24, whose outputs are scanned, and output to amplifiers 25 multiplexer 26 and buffer 23 to provide a time series voltage representation of the observed scene. The voltage sequence is converted to a binary digital time-series by an Analogue-to-Digital Converter (ADC) 22. At the output of the sensor system, therefore, a time sequence of digital data is produced, which contains encoded within it amplitude, frequency and spatial information about the scene under observation. In the case of observation of a flame, for example, the data stream will contain information on the magnitude and spatio-temporal distribution of the energy and will allow extraction of the characteristic information to allow a detection of flame to be made in the presence of benign spurious or false-alarm sources.

A digital processing system 40 is provided which processes the digital data and extracts from it the correlation functions and decision weightings from the data to allow flame detection to be made. A block of channel selection logic 27 allows the system to determine which elements, representing regions of the scene, contain 'hot-spots' and examine in greater detail the signal from these elements. The example system considers comparison of signal from two elements, although, in principle this could be expanded to more elements by extraction of more data. The channel selection logic 27 selects two elements as data sources and stores data from these elements into two data-store registers 28 & 32 over a time period allowing 256 data points to be accumulated from each element. 256 data points are considered for the purposes of this description, in practice many more data points may be stored. In principle the optimum data sizes are those of power 2; i.e. 256, 512, 1024 etc, the limitations on which are selected being those of hardware size and time required for storage. Standard hardware processes for the performance of the known mathematical operation known as Fast Fourier Transform (FFT), then process FFT on the two register sets of data 28 & 32, the result being stored in FFT registers 29 & 31. One set has the mathematical operation of complex conjugation performed upon it to provide the data set in the FFT* register 30. The operations of multiplication at 33 and inverse FFT ($FFT^{-1}$) at 34 are then performed and the resulting function, called the correlation function, is stored in a register 35. The digital processing system 40 accommodates all aspects of the system timing and performance of the algorithms and mathematical operations required, all of which are known operations which may be performed by a processor called a 'Digital Signal Processor' (DSP). This is a specific processor which may readily be utilized for this purpose and has an optimized architecture, known as the 'Harvard Architecture' which allows these functions to be readily encoded. Operations up to this point all utilize well known signal processing and manipulation operations; the next stage accommodates the custom operations specific to this system.

The maximum magnitude of the correlation function is calculated as indicated at block 36 by mathematical observation of the data stored within Correlation function register 35. This is compared with some pre-determined value, stored in register 38, and if the value is greater than the pre-determined value, the first part of the positive determination calculation is complete. The 'Lag Factor' $T_0$ is then calculated at block 37. This function determines, in conjunction with the maximum magnitude, how well correlated are the signals from the two source elements. Lag factor is again calculated by mathematical operation on the correlation function register 35. High Lag Factor, in conjunction with a maximum magnitude greater than a threshold value detected by logic block 39, indicates a positive detection of flame, or similar physical process signalled at block 30. The operations are described as being part of the Decision System accommodate knowledge based operations and algorithmic judgements on the data set and will accommodate adaptive or learning routines to refine the detection algorithms based on the observation of numerous different scenes and sources. The encoding of the Decision system may be part of a DSP system or may be performed by a separate processor system.

What is claimed is:

1. A method of identifying the presence of a flame in a scene under surveillance, comprising:

(a) forming an image of the scene on a two dimensional array of detector elements wherein each element views the image of different part of the scene;

(b) detecting thermal emissions from the scene using the array;

(c) examining signals from the detector elements and identifying a cluster of detector elements producing signals above a predetermined threshold;

(d) repeatedly examining the relationship between the thermal emission received by a first element in the cluster at a particular point in time and the thermal emission received by a second element in the cluster at a subsequent time using a cross correlation function to detect temporal variations in temperature due to turbulence;

(e) repeating step (d) for a range of time intervals between a signal from the first element and a signal from the second element and for all adjacent pairs of elements in the cluster;

(f) identifying a maximum value of the cross correlation function and the corresponding time interval in order to determine whether the turbulence is characteristic of a flame; and (g) determining whether the turbulence is characteristic of a flame by comparing the maximum value of the cross correlation function and the corresponding time interval with respective threshold values.

2. A method as claimed in claim 1 in which the possible presence of a flame is identified by comparison with temporal relationships known to be present in flames.

3. A method as claimed in claim 1 wherein step (d) comprises calculating the cross correlation function $$c(T) = \sum_i x(t_i)y(t_i + T) \text{ for different values of } T$$

where i is an integer, $x(t_i)$ is the signal received from the first element at time $(t_i)$ and y $(t_i+T)$ is the signal received from the second element at time $(t_i+T)$; whereby to identify a maximum in the relationship between c(T) and T.

4. A method as claimed in claim 3 in which the maximum value of c(T) is compared with pre-set limits in order to determine the nature of the flame.

5. A method as claimed in claim 3 in which the value of T at the maximum value of c(T) is compared with pre-set limits in order to determine the nature of the flame.

6. A method as claimed in claim 1 in which the examination of relationships is carried out by one or more microprocessors.

7. A method as claimed in claim 1 in which only radiation at wavelengths longer than 2 micrometers is detected by the detectors of the array.

8. A method as claimed in claim 1 in which the maximum wavelength radiation detected by the detectors of the array is 15 micrometers.

9. Apparatus for identifying the presence of a flame in a scene, comprising:

a two dimensional array of thermal detector elements, means for forming an image of the scene on the array such that each element views the image of different part of the scene, means for determining the relative amounts of thermal energy received by respective elements of the array and identifying a cluster of detector elements producing signals above a predetermined threshold, and means for examining periodically the relationship between the thermal emission received by a first element in the cluster at a particular point in time and the thermal emission received by a second element in the cluster at a subsequent time using a cross correlation function whereby to detect temporal variations in temperature due to turbulence, repeating said examination for a range of time intervals between a signal from tie first element and a signal from the second element and for all adjacent pairs of elements in the cluster identifying the maximum value of the cross correlation function and the corresponding time interval; and determining whether the turbulence is characteristic of a flame by comparing the maximum value of the cross correlation function and the corresponding time interval with respective threshold values.

10. Apparatus as claimed in claim 9 further comprising means for storing data relating to known types of flame and means for comparing signals from said examining means with data from said storing means.

11. Apparatus as claimed in claim 9 in which the detectors of the array detect only radiation at wavelengths longer than 2 micrometers.

12. Apparatus as claimed in claim 9 in which the maximum wavelength radiation detectable by the detectors of the array is 15 micrometers.

* * * * *